March 24, 1942.                C. H. WHITE                2,277,622
                                 PLANTER
                            Filed May 5, 1939

INVENTOR
CHARLES H. WHITE

BY
ATTORNEYS

Patented Mar. 24, 1942

2,277,622

UNITED STATES PATENT OFFICE 2,277,622

PLANTER

Charles H. White, Moline, Ill., assignor to Deere & Company, Moline, Ill., a corporation of Illinois Application May 5, 1939, Serial No. 271,824

7 Claims. (Cl. 111—88)

The present invention relates generally to planters and more particularly to planter furrow openers adapted to cut furrows having a variable depth, for planting crops such as cotton or beets. The seed of this type of crop is drilled in rows and the plants are later chopped or thinned out after they are partly grown. In each planting season there is an ideal depth of planting which is usually different each year and depends upon weather and moisture conditions. When the seed is planted all at one depth, the success of the crop depends upon the accuracy with which the farmer has guessed the correct depth for that year. The advantage of planting the seed at variable depths, therefore, is that guesswork is eliminated, for the poorer plants can always be chopped out, leaving only those which were planted at the ideal depth and thus have produced the best stand.

An object of my invention relates to the provision of a furrow opener of the single disc type, which is formed with sections disposed uniformly around the periphery of the disc and having parts disposed at different radial distances from the axis of rotation of the disc, whereby the furrow cut by the disc comprises portions of different depths.

As the disc is propelled along the ground, the portion of greater radius cuts deeper into the ground than that of shorter radius. Consequently there is a better tractive force tending to rotate the discs when a portion of greater radius is in engagement with the ground than when a short radius portion is in engagement. It is, therefore, a further object of my invention to provide means which insures a more uniform rotation of the discs and minimizing the likelihood of a disc ceasing to rotate due to insufficient traction. This object is accomplished by interconnecting two or more discs, so that they rotate together, the discs being staggered so that one of the discs has a portion of greater radius in the ground when the other is in ground engagement with a portion of short radius. Inasmuch as the discs are preferably supported on the planting implement by means providing for independent vertical movement of each disc, a related object has to do with the provision of interconnecting means which permits the discs to rise and fall independently.

These and further objects and advantages of my invention will be made apparent to those skilled in the art after a consideration of the following description, in which reference is made to the drawing appended hereto, in which Figure 1 is a fragmentary plan view of a planter of the drill type, showing two of the furrow openers and their draft connections;

Figure 1:
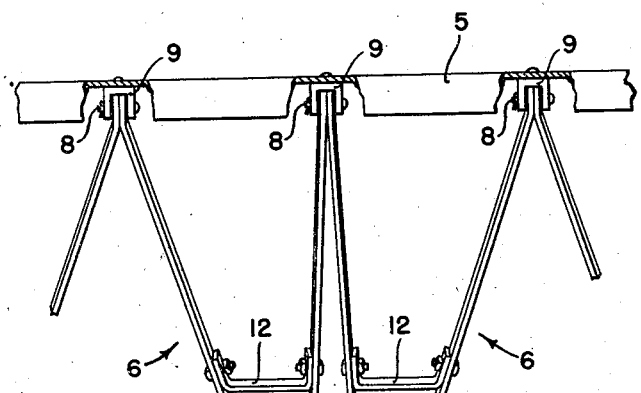
Figure 3:
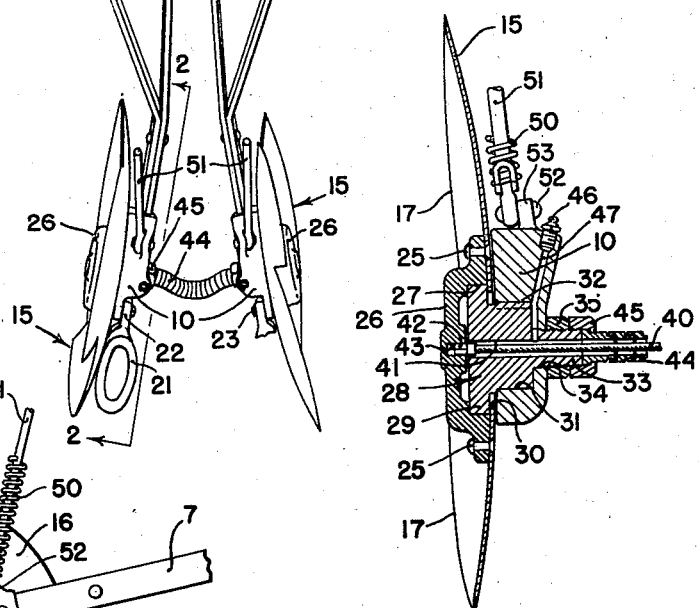
Figure 3 is a sectional view of the disc opener, taken along a line 3—3 in Figure 2.

Referring now to the drawing, the planter is illustrated by a portion of its frame 5, of which is shown a section of the transverse angle iron front frame bar, to which is pivotally connected a plurality of furrow opener draft members 6. Each draft member comprises a pair of rearwardly converging bars 7, connected for vertical swinging movement to the frame 5 by means of laterally spaced transversely aligned, pivot pins 8, which secure the draft bars to clevises 9 fixed to the frame 5. The rear ends of each pair of bars 7 lie in juxtaposition and are fixed within a recess in a furrow opener supporting casting 10 by means of suitable rivets 11. The bars 7 of each draft member 6 are interconnected rigidly by a transverse brace 12.

The furrow opener with which the present invention is particularly concerned comprises a single concavo-convex ground working disc 15, which is rotatably supported on the supporting casting 10 by means which will be described in detail presently, in a position normally at an angle to the line of advance, in order to cut a furrow of a width greater than the thickness of the disc. The peripheral portion of the disc is formed to define three sections 16 disposed uniformly around the disc, each section having an edge 17 formed on a progressively increasing radius. Preferably the edge 17 is on a spiral curve, whereby the bottom of the furrow cut by said edge, as the disc rolls forwardly, is formed in a series of substantially straight lines inclined from the horizontal. As shown in Figure 1, the disc 15 is disposed at an angle to the line of advance and also at an angle to the vertical. The first inclination insures a furrow of sufficient width to receive the seed and the second inclination provides for easy penetration, and hence a light draft.

Figure 2:
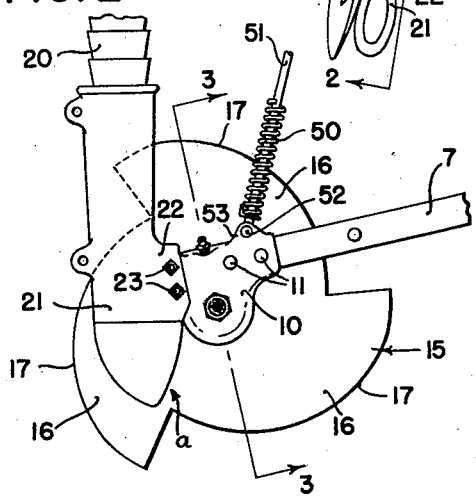
Figure 2 is an elevational view taken along a line 2—2 in Figure 1.

Seeds are deposited at close intervals along the inclined furrow bottom by means of any conventional seeding mechanism (not shown) discharging through a conventional discharge tube 20 terminating in a seed boot 21 disposed directly behind the disc and having a supporting lug 22 fixed to the supporting casting 10 by bolts 23. As best shown in Figure 2, the seed boot 21 is disposed from the axis of rotation of the disc 15 a distance corresponding approximately to the radially innermost portions of the edges 17, whereby the seed may be deposited in the furrow before soil at the advancing side of the disc has an opportunity to roll back into the furrow. The point of discharge of the seed is indicated by the reference character *a* in Figure 2.

Each disc 15 is fixed as by means of rivets 25 to a hub member 26, which has an inner bearing surface 27. A bearing member 28 is rotatably supported in the hub member 26 and has a bearing flange 29 journaled in the surface 27. The disc has a central aperture 30 of a diameter slightly less than that of the flange 29, so that it overlaps the latter and retains the bearing parts together. The bearing member 28 slidably fits into a recess 31 in the supporting casting 10 and is held against rotation relative thereto by interlocked splines 32. The bearing member 28 has a spindle portion 33 extending through an aperture 34 in the back wall of the casting 10, and is secured in place by a nut 35 engaging the outer end of the spindle 33 which is threaded to receive the nut 35.

Each pair of discs 15 is disposed with the concave surfaces facing outwardly in opposite directions in order to balance the side thrusts of the discs against each other, and it will be noted in Figure 1 that the discs are staggered, that is to say; the portion of greatest radius of one disc is directly opposite a portion of lesser radius on the other disc. This is in order that one or the other of the discs has a portion of greater radius in engagement with the ground at all times to insure substantially uniform rotation of both discs as the implement moves forwardly, rotative force being transmitted between the discs by means of a flexible cable 40 interconnecting the hub members 26 of the two discs, and extending through a central aperture 41 in the bearing member 28. Each end of the cable is fixed to an end pin 42 of square cross section, which is inserted into a square recess 43 in the hub member 26 on its axis of rotation. The cable 40 is encased in a flexible incompressible conduit 44, the opposite ends of the latter being secured to the threaded ends of the spindles 33, respectively, by means of a bushing 45.

The cable 40 is of any suitable known type, which is adapted to transmit rotary power in either direction without appreciable torsional deflection.

A lubricating fitting 46 is disposed in the end of a passage 47 which communicates with the central aperture 41 and through which lubricant can be forced between the hub and bearing members 26, 28.

In operation, the furrow openers 15 are drawn from the frame 5 by means of the draft members 6, and by virtue of the independent pivotal connections of the latter to the frame 5, the furrow openers are free to move vertically relative to each other and to the frame. They are each yieldably pressed down by means of a compression spring 50 embracing a rod 51 pivoted by a pin 52 on a lug 53 on the casting 10. The reaction of the spring is against a portion of the frame (not shown) and inasmuch as this device is well known in the art, the parts are only indicated fragmentarily on the drawing. The furrow openers are also lifted from the ground by the rods 51 in well known manner. By virtue of the flexible cable 40 and its conduit 44, which are looped between the two furrow openers to provide sufficient length, the furrow openers are not prevented by the cable or conduit from swinging vertically relative to each other as will be readily understood.

In some conditions, it may be desirable to maintain the discs with corresponding parts opposite each other instead of being staggered, in order to obtain an approximate cross check.

I claim:

1. A planter comprising a rotatable furrow opener including a single disc forming the sole furrow opening means and mounted for rotation generally in a plane disposed at an angle to the line of travel of the planter, the edge portions of said disc including sections also disposed at an angle to the line of travel, the periphery of said sections varying substantially uniformly in radial dimension, whereby when said disc is drawn through the soil, portions of the latter at progressively different depths below the surface are displaced laterally, corresponding to the form of said sections, to form a furrow of variable depth, and means for directing seed into the furrow opened by said disc.

2. A planter as defined in claim 1, further characterized by said seed directing means comprising a seed boot disposed alongside the disc on the rear side thereof and having its lower end disposed substantially radially inwardly of the path of rotation of the radially inner portions of said disc sections.

3. A planter as defined in claim 1, further characterized by said disc having substantially radially extending straight portions joining the radially inner part of one peripheral section and the contiguous radially outer part of the next adjacent peripheral section.

4. A planter comprising a pair of rotatable furrow openers for forming a pair of generally parallel spaced apart seed receiving furrows, each of said furrow openers comprising a single disc forming the sole furrow opening means for that furrow and mounted for rotation generally in a plane disposed at an angle to the line of travel of the planter, the edge portions of said disc including sections also disposed at an angle to the line of travel, the periphery of said sections varying substantially uniformly in radial dimension, whereby when said disc is drawn through the soil, portions of the latter at progressively different depths below the surface are displaced laterally, corresponding to the form of said sections, to form a furrow of variable depth.

5. A planter comprising a pair of rotatable furrow openers for forming a pair of generally parallel spaced apart seed receiving furrows, each of said furrow openers comprising a single disc forming the sole furrow opening means for that furrow and mounted for rotation generally in a plane disposed at an angle to the line of travel of the planter, the edge portions of said disc including sections also disposed at an angle to the line of travel, the periphery of said sections varying substantially uniformly in radial dimension, whereby when said disc is drawn through the soil, portions of the latter at progressively different depths below the surface are displaced laterally, corresponding to the form of said sections, to form a furrow of variable depth, and means for causing said discs to rotate together when forming said furrows.

6. A planter comprising a pair of rotatable furrow openers for forming a pair of generally parallel spaced apart seed receiving furrows, each of said furrow openers comprising a single disc forming the sole furrow opening means for that furrow and mounted for rotation generally in a plane disposed at an angle to the line of travel of the planter, the edge portions of said disc including sections also disposed at an angle to the line of travel, the periphery of said sections varying substantially uniformly in radial dimension, whereby when said disc is drawn through the soil, portions of the latter at progressively different depths below the surface are displaced laterally, corresponding to the form of said sections, to form a furrow of variable depth, and means for causing said discs to rotate together when forming said furrows and connecting said discs with a portion of greater radius of one disc substantially opposite a portion of lesser radius of the other disc so as to insure substantially uniform rotation of both discs.

7. A planter comprising a rotatable furrow opener including a single disc forming the sole furrow opening means and mounted for rotation, the edge portions of said disc including sections disposed at an angle to the line of travel, the periphery of said sections varying in radial dimension, whereby when said disc is drawn through the soil, portions of the latter at progressively different depths below the surface are displaced laterally, corresponding to the form of said sections, to form a furrow of variable depth, and means for directing seed into the furrow opened by said disc.

CHARLES H. WHITE.